(12) United States Patent
Khokhar et al.

(10) Patent No.: US 10,585,605 B1
(45) Date of Patent: Mar. 10, 2020

(54) CONFIGURING A DATA STORAGE SYSTEM BY ANALYZING AND GROUPING ACTIVITY DATA OF MULTIPLE LUNS

(71) Applicant: EMC IP Holding Company LLC, Hopkinton, MA (US)

(72) Inventors: Muzhar S. Khokhar, Shrewsbury, MA (US); Shyam Reddy, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

(21) Appl. No.: 15/499,426

(22) Filed: Apr. 27, 2017

(51) Int. Cl.
G06F 3/06 (2006.01)

(52) U.S. Cl.
CPC ............ *G06F 3/0629* (2013.01); *G06F 3/061* (2013.01); *G06F 3/0631* (2013.01); *G06F 3/0653* (2013.01); *G06F 3/0665* (2013.01); *G06F 3/0689* (2013.01)

(58) Field of Classification Search
CPC ...... G06F 3/061; G06F 3/0631; G06F 3/0653; G06F 3/0613; G06F 3/0629; G06F 3/0689; G06F 3/0683
See application file for complete search history.

(56) References Cited

U.S. PATENT DOCUMENTS

| | | | |
|---|---|---|---|
| 8,433,848 B1 | 4/2013 | Naamad et al. | |
| 8,549,224 B1 * | 10/2013 | Zeryck | G06F 3/061 |
| | | | 711/114 |
| 2007/0174672 A1 | 7/2007 | Benhase et al. | |
| 2011/0072225 A1 | 3/2011 | Kawaguchi et al. | |
| 2014/0244938 A1 * | 8/2014 | Cota-Robles | G06F 3/0611 |
| | | | 711/137 |
| 2015/0277781 A1 * | 10/2015 | Maruyama | G06F 3/0611 |
| | | | 711/114 |

OTHER PUBLICATIONS

Oracle, "How to Configure Oracle FS1-2 Storage Based on Data Skew; the Most Important New Metric in Array Configurations", Feb. 2015, 19 pages.
EMC, "EMC VNX Fast VP—A Detailed Review", Dec. 2013, 25 pages.
Muzhar S. Khokhar, et al., "Configuring a Data Storage System Based on Workload Skew," U.S. Appl. No. 15/394,134, filed Dec. 29, 2016.

* cited by examiner

*Primary Examiner* — Reginald G Bragdon
*Assistant Examiner* — Thanh D Vo
(74) *Attorney, Agent, or Firm* — Bainwood, Huang & Associates, LLC (57) ABSTRACT

Techniques for configuring a new data storage system generate IOPS distribution models from activity data of an existing data storage system and use the IOPS distribution models to generate a storage configuration for the new data storage system. Such techniques assign LUNs of the existing storage system to groups based on their input-out (I/O) characteristics and provide a storage configuration tailored to the expected IOPS distributions of each group of LUNs based on the IOPS distribution models and the activity data. The storage configurations also include RAID implementations tailored to each group of LUNs

17 Claims, 6 Drawing Sheets

CONFIGURING A DATA STORAGE SYSTEM BY ANALYZING AND GROUPING ACTIVITY DATA OF MULTIPLE LUNS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices. Data in data storage systems may be organized into logical units of storage, often referred to as "LUNs."

Some data storage systems use an assortment of data storage devices. Such data storage devices may have different performance characteristics and may be provided in respective storage tiers, with each storage tier including multiple storage devices that have similar characteristics. Each storage tier may contain a certain amount of data storage capacity, e.g., measured in gigabytes, terabytes, etc., and may include some number of storage drives to meet that capacity. As used herein, a "storage drive" is a physical device that stores data, such as an electronic flash drive, a SAS (Serial Attached SCSI—Small Computer System Interface) drive, an NL-SAS (Near Line SAS) drive, or a SATA (Serial Advanced Technology Attachment) drive, for example.

Data storage systems commonly have imbalanced, or skewed, distributions of the frequency with which various data elements are accessed. For example, in systems with high levels of skew, a small percentage of data elements are the target of a large percentage of IOPS (input/output operations per second).

SUMMARY

Unfortunately, conventional methods of configuring multi-tier data storage systems are imprecise. Imprecisely configured systems may employ too little high-performance storage and thus may fail to meet performance requirements. They may also employ too much high-performance storage and thus may fail to meet cost targets.

In contrast with prior approaches, improved techniques for configuring a new multi-tier data storage system calculate expected skew from activity data of an existing data storage system and use the expected skew to generate a storage configuration for the new data storage system. Such techniques assign LUNs of the existing storage system to groups based on their input-out (I/O) characteristics and provide storage configuration tailored to the expected skew of each group of LUNs. The storage configurations also include RAID implementations tailored to each group.

Certain embodiments are directed to a method of configuring a new data storage system. The method comprises: receiving, by processing circuitry of a computing device, machine-readable activity data for a set of logical units of storage (LUNs) belonging to an existing data storage system, the activity data containing records of read and write operations directed to the set of LUNs. The method further comprises assigning, by the processing circuitry, each LUN to one of multiple LUN groups based on the received activity data, each LUN group containing LUNs having similar input-output (I/O) characteristics to each other LUN in that group. The method still further comprises: outputting, by the processing circuitry, a storage configuration of the new data storage system.

Outputting the storage capacity of the new data storage system includes: generating an IOPS distribution model for each LUN group of the set of LUN groups using the activity data, and including, as part of the storage configuration, a storage pool for each LUN group based on the IOPS distribution model for that LUN group and the activity data, the storage pool for each LUN group having a set of tiers supplying a set of respective tier capacities, each tier capacity supplied by a respective set of storage drives, each set of storage drives having a storage drive performance class, each storage drive performance class specifying a set of storage drive performance characteristics common to each storage drive having that storage drive performance class.

Other embodiments are directed to a computer program product, an apparatus, and a system configured to perform similar methods.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

Improved techniques for configuring a new multi-tier data storage system generate IOPS distribution models from activity data of an existing data storage system and use the IOPS distribution models to generate a storage configuration for the new data storage system. Such techniques assign LUNs of the existing storage system to groups based on their input-out (I/O) characteristics and provide a storage configuration tailored to the expected IOPS distributions of each group of LUNs based on the IOPS distribution models and the activity data. The storage configurations also include RAID implementations tailored to each group of LUNs. Storage configurations generated using the improved technique are likely to be neither overdesigned nor underdesigned, and are thus likely to meet both performance requirements and cost targets.

Figure 1:
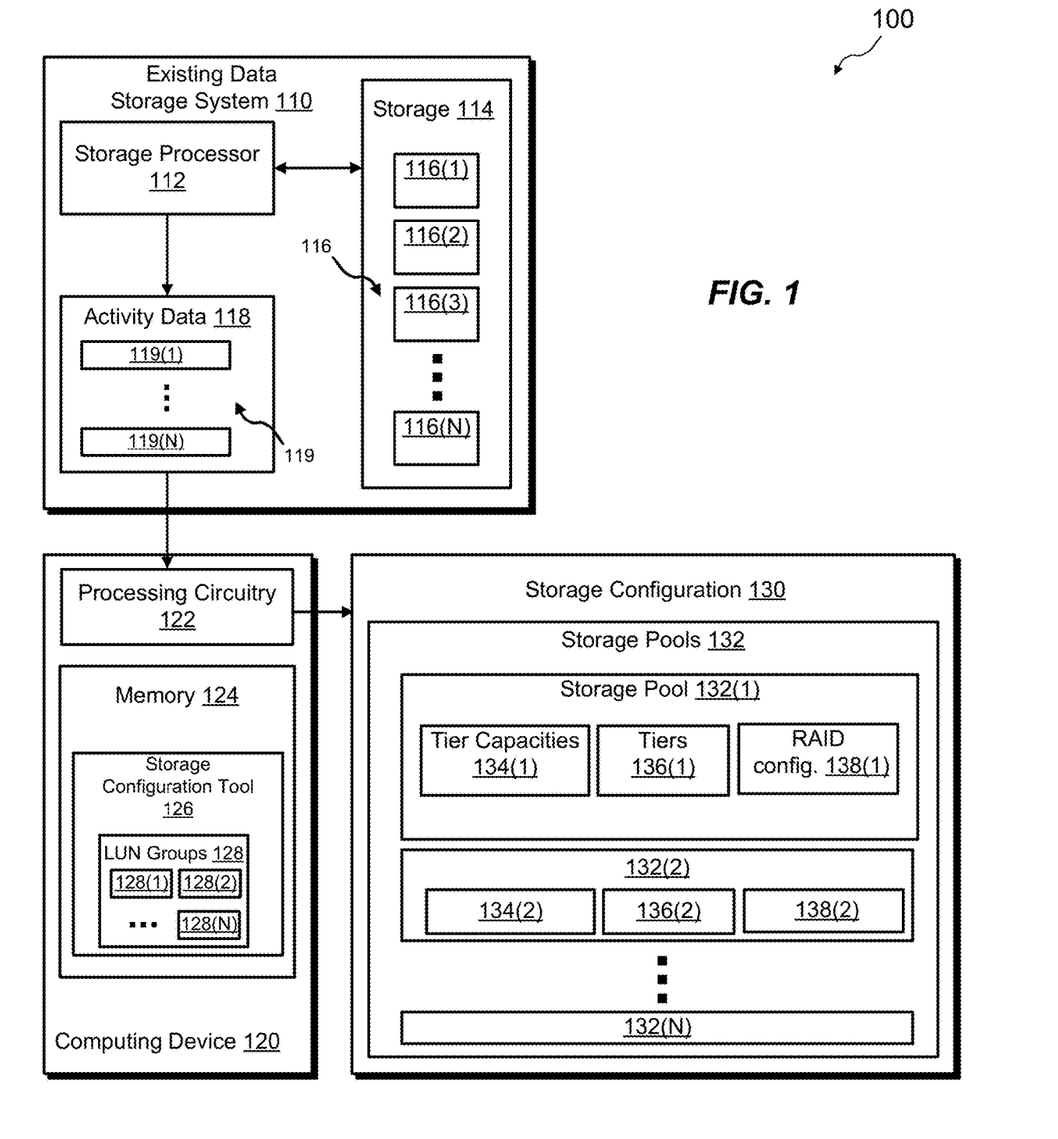
FIG. 1 is a block diagram of an example environment in which embodiments of the invention may be practiced.

FIG. 1 shows an example environment 100 in which embodiments of the improved technique hereof can be practiced. FIG. 1 also shows an example existing data storage system 110, a computing device 120, and an example storage configuration 130.

It should be understood that the techniques disclosed herein are applied to storage configurations with two or more storage tiers and are not limited to any particular number of storage tiers. The storage configuration 130 represents a storage configuration for a data storage system that is either being designed initially or that is being reconfigured, based on usage predictions generated by analysis of the existing data storage system 110. For simplicity, this document will hereafter refer to the storage configuration 130 as a storage configuration of a data storage system that already actually exists, rather than as a design of a prospective system.

The existing data storage system 110 is seen to include storage processor 112, storage 114, and activity data 118. The storage 114 includes multiple LUNs 116 (i.e., LUNs 116(1), 116(2), 116(3) . . . through 116(N)). While the data storage system 110 operates, the storage processor 112 generates records 119 of the I/O operations of the system 110 corresponding to each LUN 116, forming the activity data 118. The activity data 118 may be stored in the storage 114 of the existing data storage system 110.

The activity data 118 contains records 119 of read and write operations (depicted as a set of individual records 119(1) through 119(N)) directed to various LUNs 116 of the existing data storage system 110. The records 119 of the activity data 118 may each include information such as a type of I/O operation (e.g., a read operation or a write operation), a time stamp, an associated LUN 116, and a data size indicating how much data was read or written as part of the I/O operations associated with each record 119. Each record 119 may indicate whether an I/O request was satisfied by directly accessing the physical storage capacity of the existing data storage system 110 or by accessing cache memory of the existing data storage system 110.

The computing device 120 includes processing circuitry 122 and memory 124. The processing circuitry 122 may include one or more processing cores, chips, or assemblies. The memory 124 may be provided as both volatile and non-volatile memory. The computing device 120 may be implemented using any electronic device or machine capable of running software, such as a desktop computer, laptop computer, tablet computer, smart phone, and so forth.

Memory 124 may be any kind of digital system memory, such as, for example, random access memory (RAM). Memory 124 stores one or more operating systems (OSes) in operation (e.g., Linux, UNIX, Windows, MacOS, or a similar operating system; not depicted) and various applications (not depicted) executing on processing circuitry 122.

In some embodiments, memory 124 may also include a persistent storage portion (not depicted). The persistent storage portion of memory 130 may be made up of one or more persistent storage devices, such as, for example, disks. The persistent storage portion of memory 130 is configured to store programs and data even while the computing device 120 is powered off. The OS and the applications are typically stored in this persistent storage portion of memory so that they may be loaded into a system portion of memory 130 from this persistent storage portion of memory 130 upon a system restart. The processing circuitry 122 running one or more of these programs (such as storage configuration tool 126) thus forms a specialized circuit constructed and arranged to carry out the various processes described herein.

The storage configuration 130 represents a storage configuration for a new data storage system. The storage configuration 130 contains multiple storage pools 132, including pools 132(1), 132(2), . . . , through 132(N). Each storage pool 132 includes a set of tier capacities 134, a set of tiers 136, and a RAID configuration 138. For example, storage pool 132(1) is shown having tier capacities 134(1), tiers 136(1), and RAID configuration 138(1). Similarly, storage pool 132(2) is shown having tier capacities 134(2), tiers 136(2), and RAID configuration 138(2).

The storage configuration tool 126 of the computing device 120 receives the activity data 118 from the existing data storage system 110. The storage configuration tool 126 then analyzes the activity data 118 and generates the storage configuration 130 based on the activity data 118.

Figure 2:
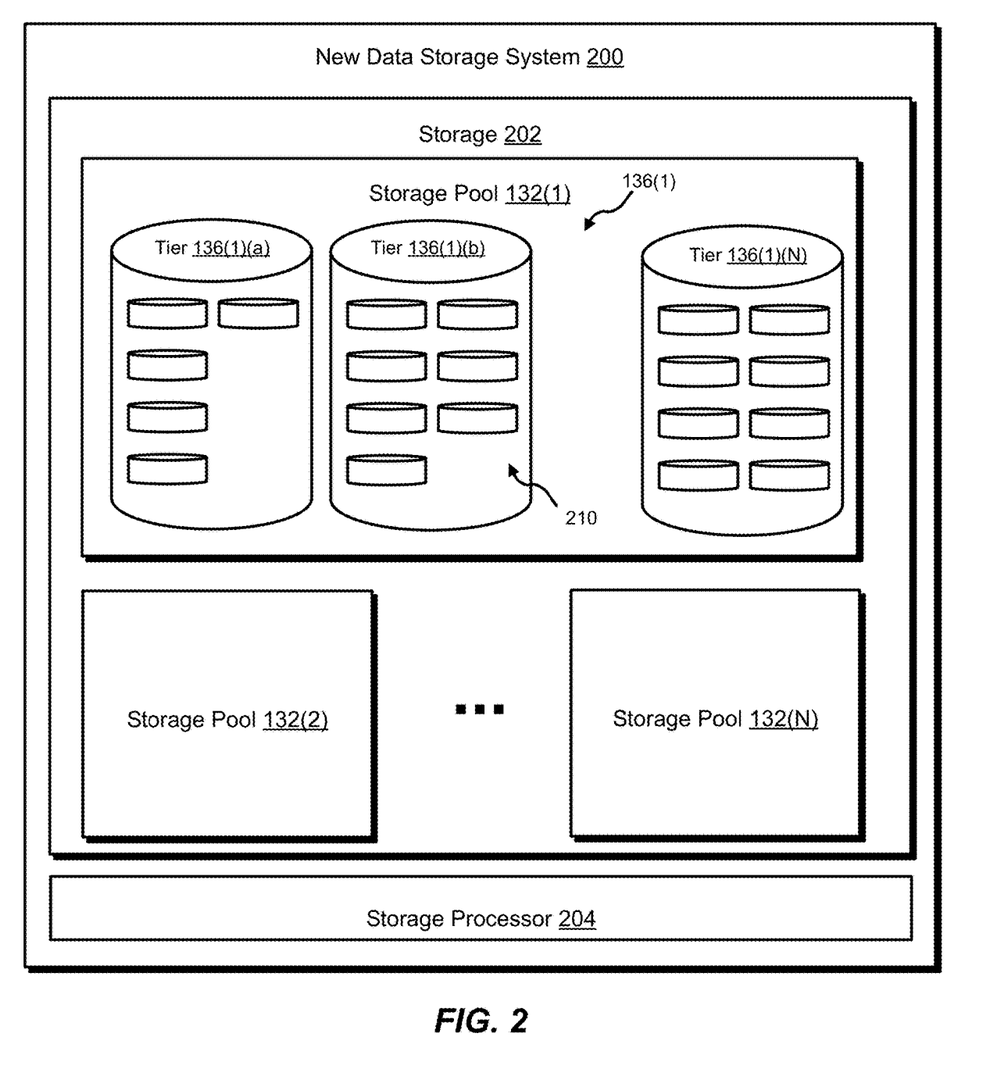
FIG. 2 is a block diagram of an example data storage system.

FIG. 2 shows an example of a new data storage system 200 configured according to the storage configuration 130 generated by computing device 120 The new data storage system 200 may be a data storage appliance such as, for example, a VNX, VNXe, or VMAX system manufactured by Dell EMC of Hopkinton, Mass. The data storage system 200 is shown having storage 202 and a storage processor 204 coupled to the storage 202. The storage processor 204 responds to requests to read and write data to the storage 202 and other functions and may include processing circuitry, interface circuitry, and memory constructed and arranged to carry out various functions of the data storage system 200.

The storage 202 has storage pools 132 as specified by the storage configuration 130. For purposes of illustration only, FIG. 2 shows storage pools 132(1), 132(2), . . . , through 132(N). It should be understood that a new data storage system such as data storage system 200 may have any number of storage pools 132, depending upon the exact configuration of the existing data storage system 110 and the relevant activity data 118.

Each storage pool 132 has tiers 136. As an example, storage pool 132(1) has tiers 136(1)(A), 136(1)(B), . . . , through 136(1)(n). Each tier 136 contains a set of physical storage drives 210. The number of storage pools 132, the number of tiers 136 in each storage pool 132, and the number of storage drives 210 in each tier 136 are determined by the storage configuration 130.

Figure 3A:
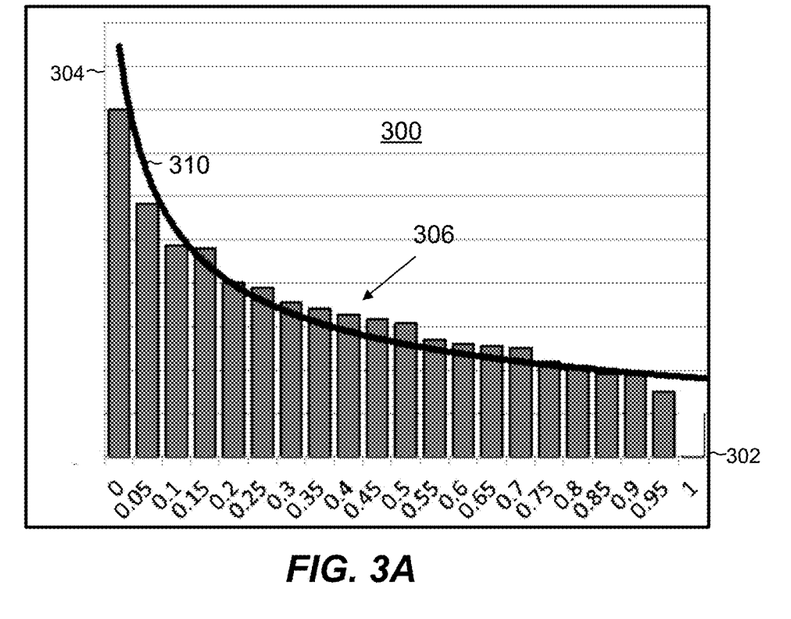
FIG. 3A is a graph showing an example relationship between IOPS (I/Os Per Second) and units of storage capacity in a data storage system.

FIG. 3A shows a graph 300 of an example I/O distribution of a data storage system 110 and an I/O distribution curve 310 related to the I/O distribution. Percent increments of storage capacity are shown on horizontal axis 302, and percent increments in IOPS are shown on the vertical axis 304. Each bar 306 indicates a portion of total IOPS in the system directed to the corresponding portion of storage. For example, the height of each bar 306 indicates the relative frequency at which IO requests in the system access the corresponding increment of storage, with the sum of heights of all bars representing all of the IOPS in the system. The total of all increments of storage along the horizontal axis 304 represents all of the storage in the system. For instance, the figure depicts a system with 20 units of storage where each unit of storage forms 5% of the total capacity of the system. The bars 306 are ordered from tallest to shortest along the horizontal axis 302. The storage increments shown along the horizontal axis are not intended to correspond to particular disk drives. Rather, they may be regarded as extents of storage, which may be represented at any desired level of granularity and in any number.

I/O distribution curve 310 approximates the distribution of IOPS shown by bars 306 using a continuous curve. Thus, while bars 306 represent actual, discrete values of IOPS for corresponding percent capacity increments, I/O distribution curve 310 approximates the same values as a continuous function.

In an example, the shape of the I/O distribution 310 is defined by the general form $y=1/x^k$, which indicates a power law relationship between IOPS (presumed to be along the y-axis) and storage capacity (presumed to be along the x-axis), where 'k' is a parameter that may be adjusted to fit different levels of skew. The shape of the I/O distribution 310 depends on the value of k. For example, k=0 would correspond to a horizontal line, which means that IOPS are distributed evenly across all units of storage. Increasing values of k>0 result in steeper decay rates and higher levels of skew. The value of k for the particular I/O distribution 310 shown in FIG. 3B, for example, is approximately 1.3. It should be understood that the power-law relationship discussed above is merely one possible form of the shape of the I/O distribution 310.

Figure 3B:
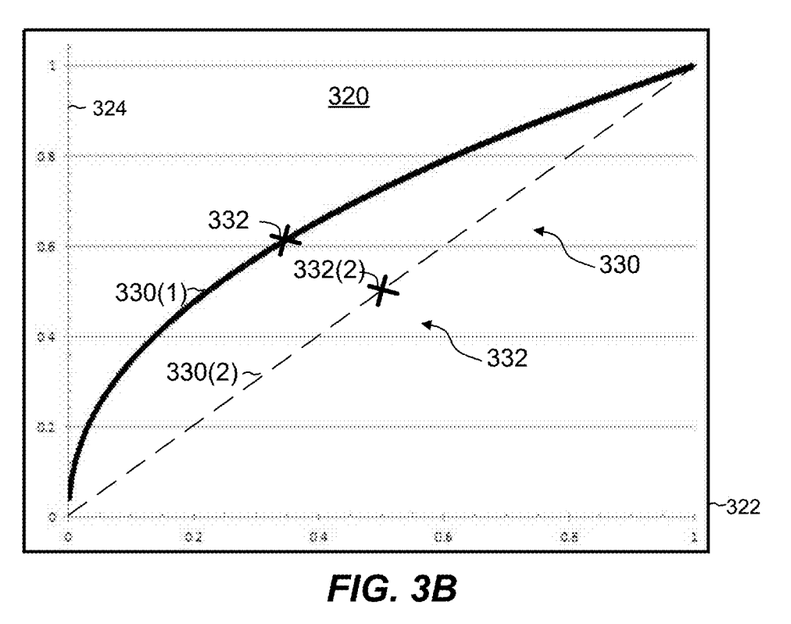
FIG. 3B is a graph showing an example relationship between cumulative percentages of IOPS and cumulative percentages of storage capacity in a data storage system.

FIG. 3B shows a graph 320 of a cumulative representation of the I/O distribution 310. Units along horizontal axis 322 are the same as those shown in FIG. 3A. Values along a vertical axis 324 correspond to cumulative IOPS percentages. A skew curve 330(1) traces out a relationship between cumulative IOPS percentages and cumulative storage percentages for the same system represented by I/O distribution 310. A skew curve 330(2) having no skew (k=0) is shown for comparison. Each point along either of the curves 330 relates a cumulative capacity percentage to a corresponding cumulative IOPS percentage, and vice-versa. In curve 330(1), for example, a cumulative capacity percentage of 0.5 (50%), accounts for 50% of all IOPS, as the system shown in curve 330(2) has no skew. Meanwhile, as shown in curve 330, 50% of the capacity accounts for approximately 70% of all IOPS, indicating a non-zero amount of skew. One should appreciate that a skew curve 330 may be computed as a discrete integral of curve 310 (FIG. 3A).

One may define a "skew point" 332 of a skew curve 330 as the point at which the cumulative IOPS percentage and the cumulative capacity percentage add to one. Given that total capacity is typically normalized to one (as in FIGS. 3A and 3B), the skew point may be expressed as the percent IOPS at which the sum of that percent IOPS and the corresponding percent capacity equals one. Using this definition, the skew point 332(2) of skew curve 330(2) is 50% because 50% of the IOPS are associated with 50% of the cumulative storage capacity (50%+50%=100%). Similarly, the skew point 332(1) of skew curve 330(1) is 62% because 62% of the IOPS are directed to 38% of the storage capacity (62%+38%=100%). While using this definition of the skew point to define a level of skew is convenient, it should be understood that many other definitions are suitable.

In some embodiments, the storage configuration tool 126 uses skew curves similar to skew curves 330 to determine how to provide the tier capacities 134 of the tiers 136 belonging to the storage pools 132. It will be appreciated that a skew curve can be used to estimate the impact on system performance of replacing slower storage drives with faster ones (which may add expense) in the storage pool 132 generated for a particular LUN group 128. By way of example, if a LUN group 128 has a skew point of 50%, then configuring 10% of the storage pool's capacity to be supplied by high-performance storage will only result in improved performance for 10% of the IOPS for that LUN group 128 (because data is accessed with uniform frequency). However, if the LUN group 128 has a skew point of 90%, then using high-performance storage for 10% of the tier capacities 134 of the storage pool 128 will result in improved performance for 90% of the IOPS. Thus the improvement expected as a result of adding more high-performance storage to a storage pool 132 depends on the skew for the corresponding LUN group 128.

Figure 4A:
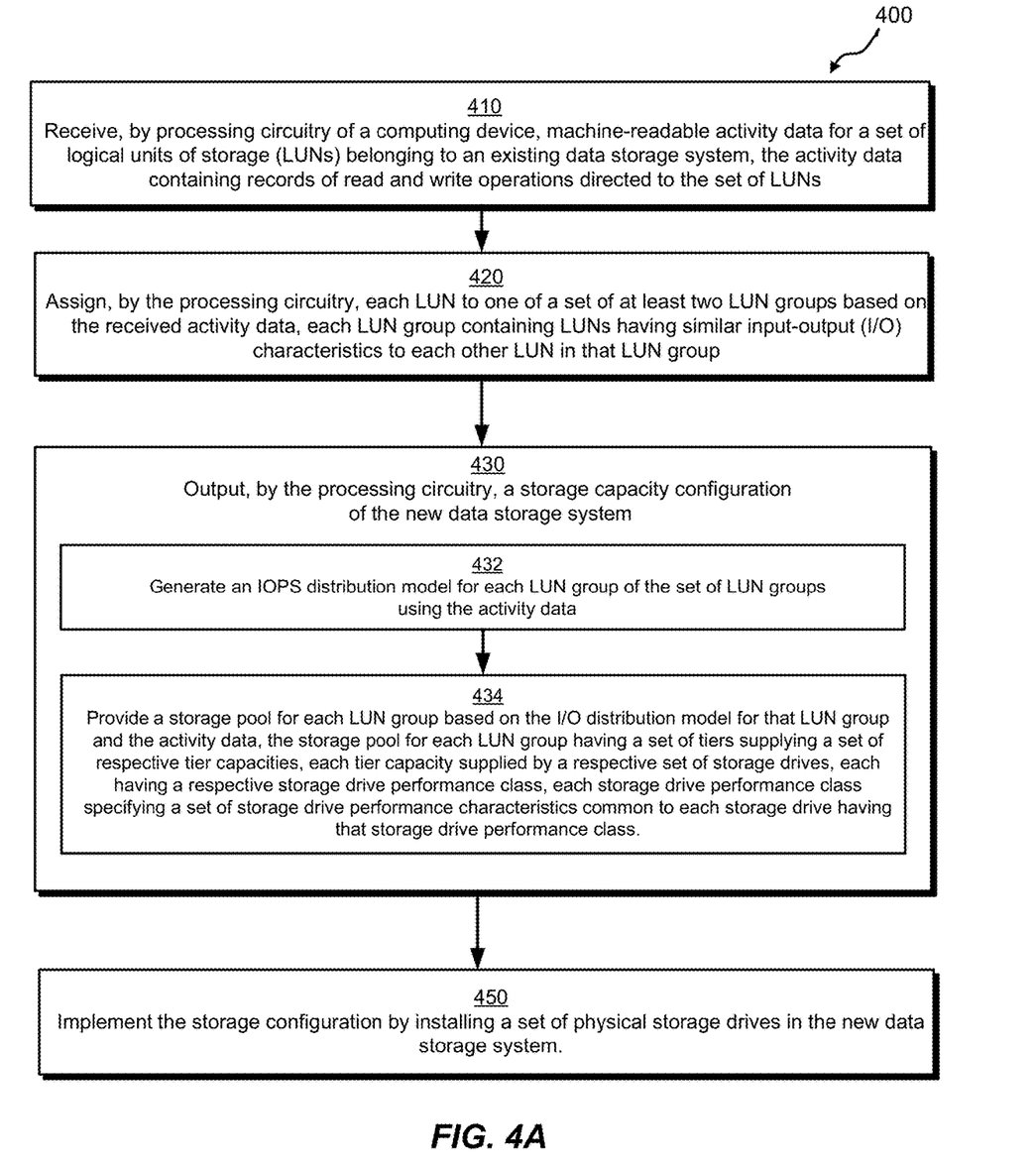
FIG. 4A is a flowchart according to various embodiments.

FIG. 4A shows an example process 400 used in some embodiments to configure a new data storage system 200, based on activity data 118 from an existing data storage system 110. The process 400 includes steps 410, 420, and 430, and 450. Step 430 includes sub-steps 432 and 434. It should be understood that any time a piece of software (e.g., storage configuration tool 126) is described as performing a method, process, step, or function, in actuality what is meant is that a computing device (e.g., computing device 120) on which that piece of software is running performs the method, process, step, or function when executing that piece of software on its processing circuitry 122. It should be understood that although depicted in one order, one or more steps or sub-steps may be combined together or performed in a different order. It should be understood that, in some embodiments, one or more of the steps may be omitted. Similarly, in some embodiments, one or more steps may be combined together or performed in a different order.

At step 410, the processing circuitry 122 of computing device 120 receives machine-readable activity data 118 for a set of LUNs 116 belonging to an existing data storage system 110. The activity data 118 containing records 119 of read and write operations 119 directed to the set of LUNs 116, as described previously in greater detail.

At step 420, the processing circuitry uses the storage configuration tool 126 to assign each LUN 116 to one of multiple LUN groups 128 based on the received activity data 118. Each LUN group 128 represents LUNs 116 having similar input-output (I/O) characteristics to each other LUN in that group, the I/O characteristics determined by the storage configuration tool 126 using the activity data 118.

At step 430 the processing circuitry 122 uses the storage configuration tool 126 to output a storage configuration 130. Outputting the storage configuration 130 includes performing sub-steps 432 and 343.

At sub-step 432, the storage configuration tool 126 generates an IOPS distribution model for each LUN group 128 of the set of LUN groups 128 using the activity data 118.

At sub-step 434, the storage configuration tool 126 provides a storage pool 132 corresponding to each LUN group 128 based on the IOPS distribution model for that LUN group 128. The storage pool 132 for each LUN group 128 has a set of tiers 136 supplying a respective set of tier capacities 134. Each tier capacity 134 is supplied by a respective set of storage drives 210. Each storage drives 210 belongs to particular storage drive performance class. Each storage drive performance class specifies a set of storage drive performance characteristics common to each storage drive 210 belonging to that storage drive performance class.

In an example, the storage configuration 130 may specify two storage pools 132(1) and 132(2). However, it should be understood that a new data storage system 200 may have any number of pools 132. The first pool 132(1) may have a set of tiers 136(1), depicted as including tier 136(1)(a), tier 136(1)(b), and 136(1)(N). The drives 210 of each tier 136 belong to different performance classes. For instance, tier 136(1)(a) may be composed of flash drives, tier 136(1)(b) may be composed of magnetic SAS drives, and tier 136(1)

(*n*) may be composed of magnetic NL-SAS drives. It should be further understood that each storage pool 132 may have a different arrangement of tiers 136. For instance, storage pool 132(2) may have only two tiers, 136(2)(*a*) and 136(2)(*b*) composed, respectively, of flash drives, and SAS drives. The relative capacities 134 of the tiers 136 within each storage pool 132 may be determined using methods such as those described, for example, in U.S. patent application Ser. No. 15/394,134, entitled "Configuring A Data Storage System Based on Workload Skew" and filed on Dec. 29, 2016 by Shyam Reddy et al., the entire contents and teachings of which are incorporated herein by this reference. It should be appreciated that the referenced application may employ terminology differently from the present Application.

At step 450, example process 400 implements the storage configuration 130 by installing a set of physical storage drives 210 in the new data storage system 200. Installation of the storage drives 210 may be performed by automated machinery or by workers following instructions for implementing the storage configuration 130.

Figure 4B:
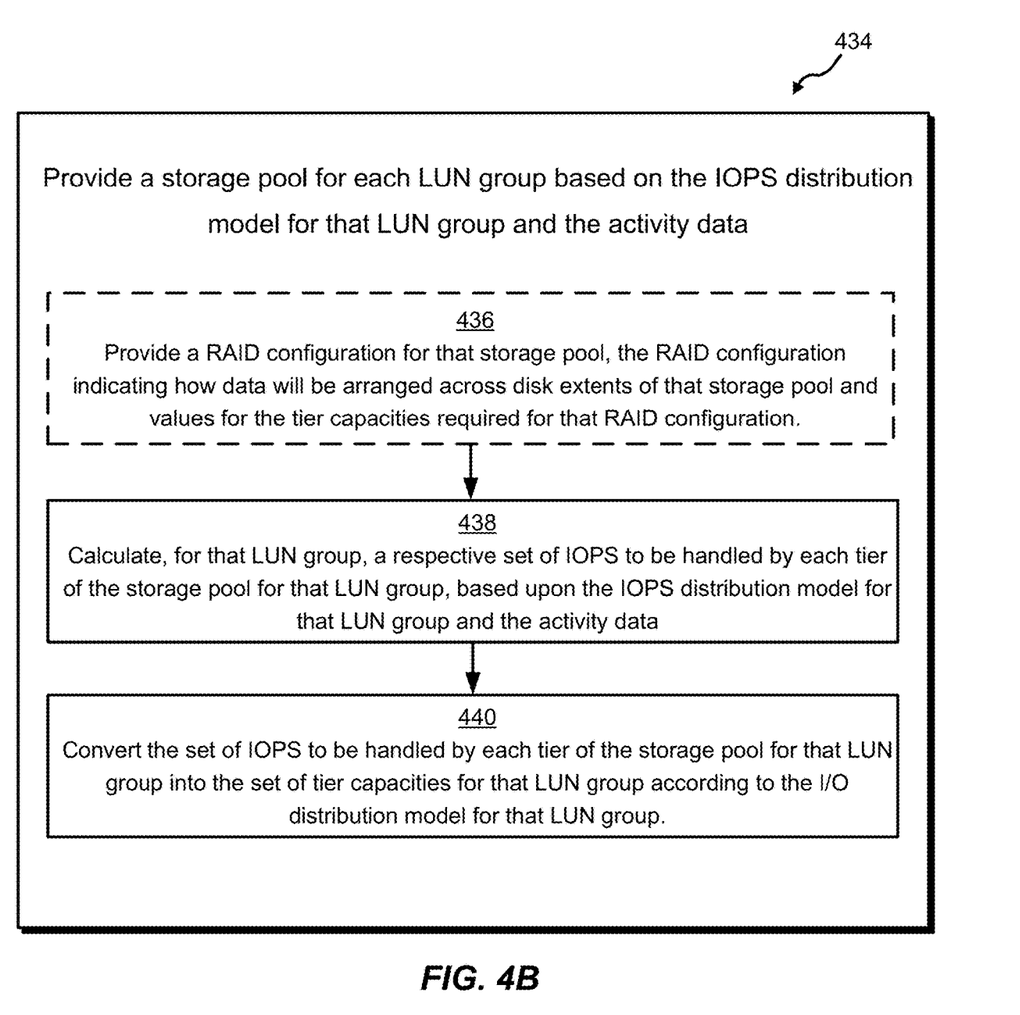
FIG. 4B is a flowchart according to various embodiments.

FIG. 4B shows an example implementation of sub-step 434 of example process 400 in FIG. 4A which includes additional sub-steps 436, 438, and 440. It should be understood that any time a piece of software (e.g., storage configuration tool 126) is described as performing a method, process, step, or function, in actuality what is meant is that a computing device (e.g., computing device 120) on which that piece of software is running performs the method, process, step, or function when executing that piece of software on its processing circuitry 122. It should be understood that although depicted in one order, one or more steps or sub-steps may be combined together or performed in a different order. It should be understood that, in some embodiments, one or more of the steps may be omitted. Similarly, in some embodiments, one or more steps may be combined together or performed in a different order.

As previously described, the storage configuration tool 126 provides a storage pool 132 for each LUN group 128 based on the IOPS distribution model for that LUN group 128 and the activity data 118 at sub-step 434 of process 400.

At sub-step 436 the storage configuration tool 126 optionally provides a RAID configuration for the storage pool, the RAID configuration indicating how data will be arranged across disk extents of that storage pool and values for the tier capacities required for that RAID configuration.

At sub-step 440, the storage configuration tool 126 converts the set of IOPS to be handled by each tier 136 of the storage pool 132 for that LUN group 128 into the set of tier capacities 134 for that storage pool 132 according to the I/O distribution model for that LUN group 128.

Figure 5:
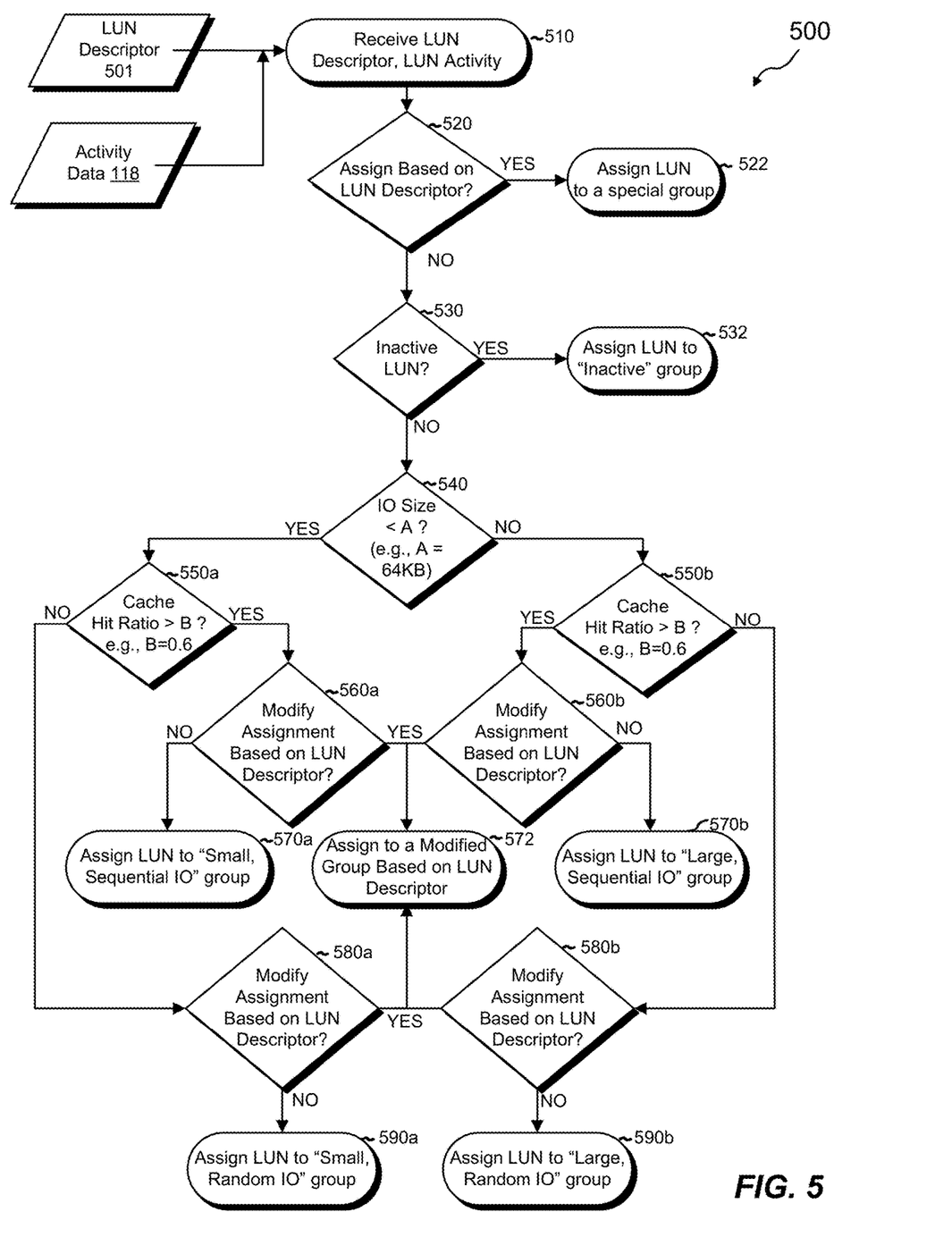
FIG. 5 is a flowchart according to various embodiments.

FIG. 5 shows a flowchart of an example process 500 performed by the storage configuration tool 126 to assign LUNs 116 to the LUN groups 128. In some embodiments, step 420 of process 400 is implemented by process 500. Also shown are activity data 118 and a LUN descriptor 501. The process 500 includes steps 510, 520, 522, 530, 532, 540, 550*a*, 550*b*, 560*a*, 560*b*, 570*a*, 570*b*, 572, 580*a*, 580*b*, 590*a*, and 590*b*. It should be understood that although depicted in one order, one or more steps or sub-steps may be combined together or performed in a different order. It should be understood that, in some embodiments, one or more of the steps may be omitted. Similarly, in some embodiments, one or more steps may be combined together or performed in a different order.

At step 510, the storage configuration tool 126 receives a LUN descriptor 501 for a particular LUN 116 and the activity data 118. At step 520, the, the storage configuration tool 126 determines whether the LUN descriptor 501 describes a LUN 116 used for a special purpose (which may be known to have particular with known performance characteristics). For example, it is well known in the art that system administrators of data storage systems or administrative software applications often give descriptive names to LUNs dedicated to particular applications. For instance, A LUN 116 which provides storage for a Microsoft Exchange server might have LUN Descriptor 501 containing the string "Exchange." Because the I/O characteristics of some special-purpose LUNs 116 are known in advance, it may be advantageous to assign such special-purpose LUNs 116 to a LUN group 128 customized for those I/O characteristics. Other examples of special-purpose LUNs 116 include LUNs 116 providing storage for quorum configuration information of a distributed computing system, LUNs 116 providing storage for Oracle or other database applications, LUNs 116 providing storage for system log files, and so on. If a LUN 116 has a LUN descriptor 501 belonging to a previously defined list of LUN descriptors 501 of such special-purpose LUNs 116, the storage configuration tool 126 proceeds to step 522 and assigns the LUN 116 to a special LUN group 128 for LUNs 116 of that type. If the LUN 116 does not have an appropriate special-purpose LUN descriptor 501, the storage configuration tool 126 proceeds to step 530.

In the some embodiments, a LUN 116 may be assigned to a LUN group 128 based on its LUN descriptor 501 before any other information about the LUN 116 is processed, according to example process 500. In other embodiments, a LUN 116 may be assigned may be assigned to a LUN group 128 based on its LUN descriptor 501 only after satisfying other conditions.

At step 530 the storage configuration tool 126 determines whether the LUN 114 is active or inactive. The storage configuration tool 126 may determine that a LUN 116 is active or inactive by examining the total number of IOPS directed to the LUN 116 and the total IOPS relative to the storage capacity of that LUN 116. The storage configuration tool 126 may also examine the LUN descriptor 501. In an example, if a LUN 116 handles both a minimum number of absolute IOPS and a minimum ratio of total IOPS to total capacity of the LUN 116 (i.e., a number of input-output operations per second per gigabyte), the LUN 116 is determined to be active. Alternatively, a LUN 116 handling a minimum number of IOPS and having a particular LUN descriptor 501 (e.g., a LUN Descriptor 501 containing the string "ESX" or "VDI," indicating specific use cases for the LUN 116) may also be determined to be an active LUN 116.

If the storage configuration tool 126 identifies a LUN 116 as active at step 530, the process proceeds to step 532 where the LUN 116 is assigned to a LUN group 128 for inactive LUNs 116. Otherwise, the process proceeds to step 540.

At step 540, the storage configuration tool 126 determines whether I/O operations directed to the LUN 116 are characterized by transferring "small" or "large" amounts of data by comparing an average I/O size for the LUN 116 to predetermined threshold. The average I/O size is the average amount of data transferred by the LUN 116 during one I/O operation. For example, if the LUN 116 handles one read operation that transfers 100 kilobytes and one write operation that transfers 50 kilobytes, the I/O size for the LUN 116 is 75 kilobytes.

Depending on whether the I/O size for the LUN 116 is smaller than a predetermined threshold (e.g., 64 kilobytes), the process 500 proceeds to either step 550*a* or step 550*b*.

It is well known that data storage systems provide read and write cache memory to speed access to routinely accessed data. The frequency with which I/O operations directed to the LUN 116 are handled by accessing cache memory (as opposed to directly accessing the physical storage capacity of the LUN 116) can be used as measure of how "random" or "sequential" the I/O operations handled by LUN 116 tend to be. For instance, if data stored in the LUN 116 tend to be accessed sequentially, then there is a greater likelihood that each I/O operation will be handled by reading or writing to the cache memory. However, if the data stored in LUN 116 tend to be accessed more randomly, there will be a greater likelihood that each I/O operation directed to the LUN 116 will require directly accessing physical storage capacity of the LUN 116.

At step 550a (alternatively, 550b) the storage configuration tool 126 determines whether I/O operations directed to the LUN 116 predominately access random locations in the LUN 116 or predominately accessing sequential ranges of locations in the LUN 116 by comparing a cache-hit ration to a predetermined threshold (e.g., 0.6). The cache hit ratio represents the fraction of I/O operations directed to the LUN 116 which are handled by accessing cache memory. In the depicted example, for instance, a cache-hit ratio greater than 0.6 is taken to indicate predominantly sequential access to LUN 116.

If the cache-hit ratio is greater than the predetermined threshold, the process 500 proceeds to step 560a (or 560b). Otherwise, the storage configuration tool 126 proceeds instead to step 580a (or 580b).

At step 560a (or 560b), the storage configuration tool 126 examines the LUN descriptor 501 to determine if the storage configuration tool 126 should continue to assign the LUN 116 to a particular LUN group 128 or if the storage configuration tool 126 should override the LUN assignment based on the LUN descriptor 501. For example, a special-use LUN 116 may have similar characteristic to other LUNs 116 assigned to the particular LUN group 128. However, the LUN descriptor 501 may indicate that the special-use LUN 116 should be assigned to a special LUN group 128 despite its similar characteristics to other LUNs 116.

If the storage configuration tool 126 determines that the LUN assignment should be overridden, then storage configuration tool 126 proceeds to step 572 and assigns the LUN 116 to a modified LUN group 128 based on the LUN descriptor 501. Otherwise, the process 500 proceeds to step 570a (570b) and assigns the LUN 116 to an appropriate LUN group 128. In the example process 500, the storage configuration tool 126 assigns the LUN 116 to a LUN group 128 for LUNs 116 characterized by small I/O sizes (large I/O sizes) and sequential access.

At step 580a (or 580b), similarly to step 560a (or 560b), the storage configuration tool 126 examines the LUN descriptor 501 to determine if the storage configuration tool 126 should continue to assign the LUN 116 to a particular LUN group 128 or if the storage configuration tool 126 should override the LUN assignment based on the LUN descriptor 501.

If the storage configuration tool 126 determines that the LUN assignment should be overridden, then the process 500 proceeds to step 572 and assigns the LUN 116 to a modified LUN group 128 based on the LUN descriptor 501. Otherwise, the storage configuration tool 126 proceeds to step 590a (590b) and assigns the LUN 116 to an appropriate LUN group 128. In example process 500, the storage configuration tool 126 assigns the LUN 116 to a LUN group 128 for LUNs 116 characterized by small I/O sizes (large I/O sizes) and random access at step 590a (590b).

Thus, techniques have been presented for configuring a new data storage system 200 which calculate expected skew from activity data 118 of an existing data storage system 110 and use the expected skew to generate a storage configuration 130 for the new data storage system 200. Such techniques assign LUNs 116 of the existing storage system 110 to LUN groups 128 based on their input-out (I/O) characteristics and provide a storage configuration 130 for the new data storage system 200 tailored to the expected skew of each LUN group 128. The storage configuration 130 also includes RAID configurations 138 tailored to each LUN group 128.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of configuring a new data storage system, the method comprising:
   receiving, by processing circuitry of a computing device, machine-readable activity data for a set of logical units of storage (LUNs) belonging to an existing data storage system, the activity data containing records of read and write operations directed to the set of LUNs, wherein each of the records of read and write operations directed to the set of LUNs includes an I/O size, the I/O size of each record indicating a number of bytes transferred as part of an I/O operation corresponding to that record;
   assigning, by the processing circuitry, each LUN to one of multiple LUN groups based on the received activity data, each LUN group representing LUNs having similar input-output (I/O) characteristics to each other LUN in that group, wherein assigning each LUN to one of the multiple LUN groups based on the received activity data includes:
      calculating, for at least one LUN, an average I/O size for a subset of the activity data corresponding to read and write operations directed to that LUN; and
      assigning the at least one LUN to a LUN group based at least in part on the average I/O size of all the records for that LUN; and
   outputting, by the processing circuitry, a storage configuration of the new data storage system by:
      generating an IOPS (I/O operations per second) distribution model for each LUN group of the set of LUN groups using the activity data; and
      including, as part of the storage configuration, a storage pool for each LUN group based on the IOPS distribution model for that LUN group and the activity data, the storage pool for each LUN group having a set of tiers supplying a set of respective tier capacities, each tier capacity supplied by a respective set of storage drives, each set of storage drives having a storage drive performance class, each storage drive performance class specifying a set of storage drive performance characteristics common to each storage drive having that storage drive performance class.

2. The method of claim 1,
   wherein generating the IOPS distribution model for each LUN group includes:
      ordering extents of storage capacity belonging to LUNs assigned to that LUN group according to a number of IOPS directed to each of the extents; and
      providing a relationship between percentiles of extents of the LUNs assigned to that LUN group and cumulative percentages of IOPS directed to each percentile; and
   wherein including, as part of the storage configuration, the storage pool for each LUN group based on the IOPS distribution model for that LUN group includes:
      calculating, for that LUN group, a respective set of IOPS to be handled by each tier of the storage pool for that LUN group, based upon the IOPS distribution model for that LUN group and the activity data; and
      converting the set of IOPS to be handled by each tier of the storage pool for that LUN group into the set of tier capacities for that LUN group according to the IOPS distribution model for that LUN group.

3. The method of claim 2,
   wherein each of the records of read and write operations directed to the set of LUNs indicates whether a particular I/O request was fulfilled by accessing cache memory of the existing data storage system or directly accessing physical storage capacity of the existing data storage system; and
   wherein assigning each LUN to one of the multiple LUN groups based on the received activity data further includes:
      calculating, for at least one LUN, a cache-hit ratio for a subset of the activity data corresponding to read and write operations directed to that LUN, the cache hit ratio for that LUN indicating a percentage of I/O requests directed to that LUN fulfilled by accessing the cache memory; and
      assigning the at least one LUN to a corresponding LUN group based at least in part on the calculated cache-hit ratio for that LUN.

4. The method of claim 3, wherein assigning the at least one LUN to its corresponding LUN group based at least in part on the calculated cache-hit ratio for that LUN includes, in response to generating a comparison result indicating that the calculated cache-hit ratio is less than a predetermined threshold, outputting a LUN group to which that LUN will be assigned.

5. The method of claim 3, wherein assigning the at least one LUN to its corresponding LUN group based at least in part on the calculated cache-hit ratio for that LUN includes, in response to generating a comparison result indicating that the calculated cache-hit ratio is greater than a predetermined threshold, outputting a LUN group to which that LUN will be assigned.

6. The method of claim 1, wherein assigning the at least one LUN to its corresponding LUN group based at least in part on the calculated average I/O size for that LUN includes, in response to generating a comparison result indicating that the calculated average I/O size is less than a predetermined threshold, outputting a LUN group to which that LUN will be assigned.

7. The method of claim 1, wherein assigning the at least one LUN to its corresponding LUN group based at least in part on the calculated average I/O size for that LUN includes, in response to generating a comparison result indicating that the calculated average I/O size is greater than a predetermined threshold, outputting a LUN group to which that LUN will be assigned.

8. The method of claim 1, wherein including, as part of the storage configuration, the storage pool for each LUN group based on the IOPS distribution model for that LUN group includes providing a RAID configuration for that storage pool, the RAID configuration indicating how data will be arranged across disk extents of that storage pool and values for the tier capacities required for that RAID configuration.

9. The method of claim 1,
   wherein the machine-readable activity data for the set of LUNs belonging to the existing data storage system includes a set of LUN descriptors, each LUN descriptor associated with a LUN of the set of LUNs belonging to the existing data storage system; and
   wherein assigning each LUN to one of the multiple LUN groups based on the received activity data further includes assigning at least one LUN of the set of LUNs belonging to the existing data storage system to one of the multiple LUN groups based on the LUN descriptor associated with that LUN.

10. The method of claim 1, wherein the method further comprises implementing the storage configuration by installing a set of physical storage drives in the new data storage system.

11. A computer program product comprising a set of non-transitory, computer-readable storage media storing instructions which, when executed by processing circuitry of a computing device, cause the processing circuitry to configure a new data storage system by:
receiving, by the processing circuitry, machine-readable activity data for a set of logical units of storage (LUNs) belonging to an existing data storage system, the activity data containing records of read and write operations directed to the set of LUNs, wherein each of the records of read and write operations performed by each LUN includes an I/O size, the I/O size of each record indicate a number of bytes transferred as part of an I/O operation corresponding to that record;
assigning, by the processing circuitry, each LUN to one of multiple LUN groups based on the received activity data, each LUN group representing LUNs having similar input-output (I/O) characteristics to each other LUN in that group, wherein assigning each LUN to one of multiple LUN groups based on the received activity data includes:
calculating, for at least one LUN, an average I/O size for a subset of the activity data corresponding to read and write operations directed to that LUN; and
assigning the at least one LUN to a corresponding LUN group based at least in part on the average I/O size of all the records for that LUN; and
outputting, by the processing circuitry, a storage configuration of the new data storage system by:
generating an IOPS distribution model for each LUN group of the set of LUN groups using the activity data; and
including, as part of the storage configuration, a storage pool for each LUN group based on the IOPS distribution model for that LUN group and the activity data, the storage pool for each LUN group having a set of tiers supplying a set of respective tier capacities, each tier capacity supplied by a respective set of storage drives, each set of storage drives having a storage drive performance class, each storage drive performance class specifying a set of storage drive performance characteristics common to each storage drive having that storage drive performance class.

12. The computer program product of claim 11,
wherein generating the IOPS distribution model for each LUN group includes:
ordering extents of storage capacity belonging to LUNs assigned to that LUN group according to a number of IOPS directed to each of the extents; and
providing a relationship between percentiles of extents of the LUNs assigned to that LUN group and cumulative percentages of IOPS directed to each percentile; and
wherein including, as part of the storage configuration, the storage pool for each LUN group based on the IOPS distribution model for that LUN group includes:
calculating, for that LUN group, a respective set of IOPS to be handled by each tier of the storage pool for that LUN group, based upon the IOPS distribution model for that LUN group and the activity data; and
converting the set of IOPS to be handled by each tier of the storage pool for that LUN group into the set of tier capacities for that LUN group according to the IOPS distribution model for that LUN group.

13. The computer program product of claim 12,
wherein each of the records of read and write operations performed by each LUN indicates whether a particular I/O request was fulfilled by accessing cache memory of the existing data storage system or directly accessing physical storage capacity of the existing data storage system; and
wherein assigning each LUN to one of the multiple LUN groups based on the received activity data further includes:
calculating, for at least one LUN, a cache-hit ratio for a subset of the activity data corresponding to read and write operations directed to that LUN, the cache hit ratio for that LUN indicating a percentage of I/O requests directed to that LUN fulfilled by accessing the cache memory; and
assigning the at least one LUN to a LUN group based at least in part on the calculated cache-hit ratio for that LUN.

14. The computer program product of claim 13, wherein assigning the at least one LUN to its respective LUN group based at least in part on the calculated cache-hit ratio for that LUN includes:
generating a comparison result indicating whether the calculated cache-hit ratio of all the records for that LUN is less than a predetermined threshold ratio; and
selecting the corresponding LUN group for that LUN based on the comparison result.

15. The computer program product of claim 11, wherein assigning the at least one LUN to its corresponding LUN group based at least in part on the average I/O size of all the records for that LUN includes:
generating a comparison result indicating whether the average I/O size of all the records for that LUN is less than a predetermined threshold size; and
selecting the corresponding LUN group for that LUN based on the comparison result.

16. The computer program product of claim 11,
wherein the machine-readable activity data for the set of LUNs belonging to the existing data storage system includes a set of LUN descriptors, each LUN descriptor associated with a LUN of the set of LUNs belonging to the existing data storage system; and
wherein assigning each LUN to one of multiple LUN groups based on the received activity data further includes assigning at least one LUN of the set of LUNs belonging to the existing data storage system to one of the multiple LUN groups based on the LUN descriptor associated with that LUN.

17. The computer program product of claim 11, wherein including, as part of the storage configuration, the storage pool for each LUN group based on the IOPS distribution model for that LUN group includes providing a RAID configuration for that storage pool, the RAID configuration indicating how data will be arranged across disk extents of that storage pool and values for the tier capacities required for that RAID configuration.

* * * * *